Figure 1:
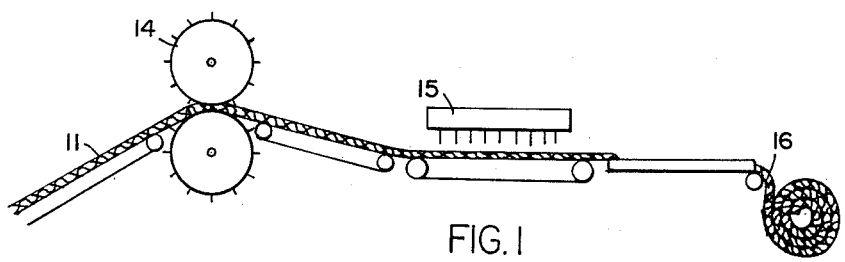

Feb. 18, 1964    M. J. GLUCK    3,121,656
MOLDABLE COMPOSITION
Filed July 28, 1961

Martin J. Gluck INVENTOR.
BY Ezekiel Wolf, Wolf & Greenfield
ATTORNEYS

United States Patent Office 3,121,656
Patented Feb. 18, 1964

3,121,656
MOLDABLE COMPOSITION
Martin J. Gluck, Somerset, Mass.
(% Contours Unlimited, Winter St., Franklin, Mass.)
Filed July 28, 1961, Ser. No. 127,569
8 Claims. (Cl. 161—158)

The present invention relates to an improved composition of material adapted to be molded into complex contoured and deep-drawn products, a process for forming deep-drawn products of such material and an improved molded product.

Heretofore a number of compositions have been developed in the form of resin-impregnated fibers for use in molding products such as luggage, furniture, construction and building panels, automotive parts, etc. These compositions have included a highly compacted fibrous web with a filler material. Such composition however must be pre-shaped and conformed to the shape of the mold before being placed in it in order to permit a proper closing. Material has also been made which comprises inert staple fibers needled into an interlocked body and heavily impregnated with a tacky film-forming or plasticized resin such as phenyl formaldehyde to form a mass without voids or pores. When such compositions are molded particularly in deep-draw molds, the heavily compacted fiber mass will tear or wrinkle particularly in the contoured portions. Moreover such composition often has unimpregnated portions which result in a nonuniform molded product. Materials impregnated with resins such as phenyl formaldehyde, in addition to being difficult to mold due to restriction of fiber movement and lack of uniform impregnation, are difficult to store safely prior to molding. These materials very often tend to set during storage. They also require long cure cycles and in many instances leave objectionable odors in the finished product.

It is therefore an object of the present invention to provide a heat moldable composition particularly useful in forming deep-drawn contoured products. The composition may be molded without pre-forming, shaping or trimming prior to insertion in a mold with the final product having a nonwrinkled surface and uniform thickness.

A further object of the present invention is to provide a composition for deep-draw molding which is easily shaped due to the freedom of movement of individual fibers relative to one another. The composition is also designed to provide an end product having greater compactness and consequently greater strength in contoured portions than in flat portions.

Furthermore this composition has unlimited stability in its pre-molded form. The composition does not contain odor bearing plasticizers and consequently is odor free. Moreover the composition is relatively inexpensive and readily moldable.

In the present invention there is provided a composition comprising a plurality of fibers intertwined to form a porous mechanically interlocked fibrous mass. The mass of fibers are preferably formed of jute needled or gigged into an interlocked porous mass. Dispersed throughout the mass are discrete particles preferably in a particle size of between .01 micron and .55 micron, of nontacky, nonfilm forming, nonplasticized heat moldable resin, preferably a polyvinyl chloride resin having a molecular weight ranging preferably between about 60,000 and 150,000. The resin particles and fibers comprise a non-displaceable bulk with voids formed therein in a fiber and resin to void ratio of between 1 to 3 and 1 to 32. The resin preferably comprises one-half the weight of the fibers but may range by weight between 2% and 70% of the total weight of the resin and fibers depending on the nature of the fiber. The bulkier the fiber, the greater the weight of resin. This composition may be readily fitted into deep draw molds and compacted and molded under heat and pressure without the necessity of pre-forming, shaping, trimming or cutting. Nor is there normally any need for further impregnation of the composition or for surface finishing after molding. The composition when positioned in a deep draw mold will readily conform to the shape of the mold without tearing or shearing in portions. The finished product will have a uniform thickness conforming to the desired shape as defined by the mold with portions in the contoured parts more heavily compacted than other portions. This is normally desirable as the curved portions are usually the weakest parts of the molded product, and require the greatest amount of reinforcement.

The present invention also provides a novel means for forming a molded product wherein a chemically inert porous fibrous mass, preferably jute fibers, is impregnated with a quantity of discrete nonfilm forming, nonplasticized, nontacky heat moldable particles, preferably polyvinyl chloride particles, with these particles dispersed by means of an aqueous volatile vehicle throughout the mechanically interlocked porous mass. The particles are homogeneously infiltrated throughout the mass, and in the case of jute fibers also penetrate the hollow cellulose structure of the fibers. This impregnated mass, preferably after drying, may be formed into a deep-drawn shape by introducing the composition into a mold and thereafter applying heat and pressure to compact the fibers into a dense relatively rigid structure.

While the foregoing suggests the preferred embodiments of the invention, also contemplated is a composition formed of pre-treated fibers wherein the fibers are individually coated with film forming or non-film forming resins of the thermoplastic or thermosetting type or combinations thereof. These fibers are formed in a mass and interlocked by needling or gigging with a preselected ratio of voids to solids which permit the mass to be readily formed into a contoured shape and thereafter compacted into a relatively rigid form under the influence of heat and pressure.

Figure 4:
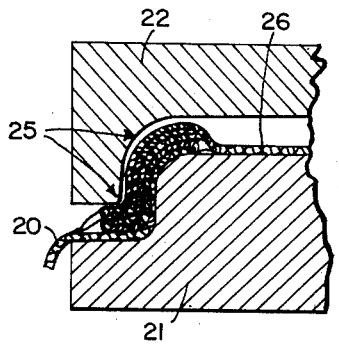
Figure 5:
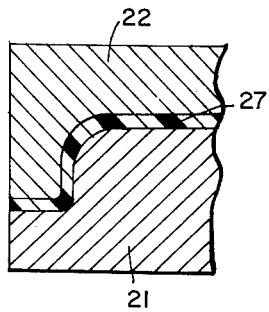
Figure 6:
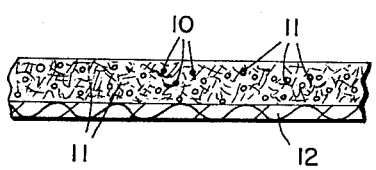

These and other objects and advantages of the present invention will be more clearly understood when considered in conjunction with the accompanying drawings in which:

FIGS. 1 to 5 are schematic illustrations of steps in the process of forming a molded product; and FIG. 6 is a schematic illustration of an impregnated composition comprising the present invention.

Referring to FIG. 6 there is illustrated a flexible, deformable, compressible, chemically stable, light-weight, moldable mass. This mass comprises a web of fibers 10 which may be in staple or sliver form. These fibers are interlocked into a porous mass by suitable mechanical means such as conventional needling or gigging wherein small groups of tufts of fibers are pulled through the web, usually by barbed needles, to interlock the fibers of the web into an integral mass. The fibers are preferably hollow cellular jute fibers but may comprise other inert natural or synthetic fibers such as cellulose, fiberglas, nylon, rayon, brass, aluminum or steel, etc. Dispersed throughout the interfiber voids of the fibrous mass are discrete particles of a nonfilm forming, nonplasticized heat moldable, nontacky resin 11. Preferably these particles are formed of a polyvinyl chloride resin having an average particle size of .2 micron. A range of .01 micron to .55 micron, however, is satisfactory. While the size of these particles within this range is not particularly critical, the particles should not be so small as to readily fall from the mass, nor so large that they would prevent the ready deformation of the mass into a desired form. The resin preferably weighs substantially 50% of the weight of the fibers. However, a range of between 2% and 70% of the total weight of the resin and fibers (or solids) is satisfactory. The fibers and resin particles are compacted so that there is a fiber and resin (or solid) to void ratio of between 1 to 3 and 1 to 32. Preferably the fiber and resin have a 1 to 16 fiber and resin to void ratio. If desired the fibers may be reinforced with a woven or matted reinforcing material 12 formed of material such as burlap, cotton cloth, plastic netting, etc.

The voids between the fibers and resin particles 10 and 11 may be filled with air or other displaceable fluid material such as water.

Figure 2:
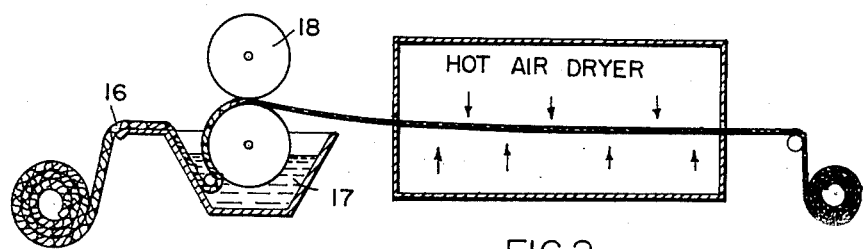

In the formation of the composition illustrated in FIG. 6, a plurality of jute fibers 11, either in staple or sliver form, are first formed into a mass by suitable and conventional means, by a carding machine or the like, schematically illustrated at 14. The mass of jute fibers is then formed into an integrated partially compact mass wherein the individual fibers are mechanically locked one to another by suitable needling or gigging means. This interlocking may be accomplished by conventional needle looms schematically illustrated at 15 which pull tufts of the fibers through the mass to interlock the fibers into a porous mechanically interlocked fibrous mat 16. The mat 16 is then introduced into a resin bath 17 (FIG. 2). This resin bath preferably comprises an aqueous dispersed solution of nontacky, nonfilm forming, nonplasticized resin particles, preferably polyvinyl chloride particles having a particle size of between .01 micron and .55 micron. The aqueous solution may comprise any volatile fluid which is nonreactive with the resin particles and preferably comprises water. For best results the solid particles should comprise 36% of the total aqueous solution. However, a range of 2% to 60% is satisfactory. After the mat 16 has been immersed in the resin solution 17 a sufficient length of time to permit a thorough dispersion of the resin particles throughout the mat 16, it is withdrawn and squeezed dry by suitable means such as squeeze rollers 18. Following this the partially dried mat may be dried in a hot air drier in which the aqueous solution is volatilized and driven off and the resin particles are allowed to remain intimately mixed with the fibers. A temperature of 320° to 450° F. has been found satisfactory for hot air drying. If the fibers are formed of jute the resin particles are dispersed not only throughout the fibrous mass but also within the jute fibers themselves since the jute fibers are normally hollow.

Figure 3:
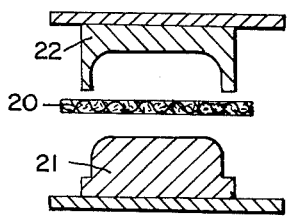

The resin impregnated fibrous composition 20 as thus formed may be molded as illustrated in FIGS. 3, 4 and 5. This composition is particularly useful for molding deep-drawn shapes. The composition is positioned between the male and female halves 21, 22 of a mold without the necessity of trimming, shaping, cutting or shearing the composition. The thickness of the composition 20 is selected so that in its compacted form it will readily fill the closed mold. After positioning the composition 20 between the male and female halves of the mold it is closed as illustrated in FIG. 4 under the influence of pressure supplied from a suitable source such as a hydraulic press. Upon closing the mold the composition 20 is compacted in the contoured or curved portions 25 to a greater degree than in the noncontoured portions 26. As illustrated in FIG. 4 the uncompressed composition 20 may have, for example, a thickness of ⅜″. In the flat portion of the mold in this example, this thickness may be compresed to ⅟₁₆ of the ⅜″ thtickness. In the curved or contoured portion of the mold at 25 the composition 20 is bunched or wrinkled so that there are in fact five plies. These five plies as indicated are each ⅜″ thick. In closing the mold these plies are compressed to a thickness equal to the thickness in the flat portion 26 so that at the corner 25 they are compacted into a much denser composition than at 26. The mold is heated sufficiently to drive off the displaceable fluids such as water and to cure the resin particles, which under the influence of heat and pressure are compacted into a rigid, nondeformable, solid, smooth surface end product, as illustrated at 27 in FIG. 5.

While polyvinyl chloride resin particles having a molecular weight of between 60,000 and 150,000 is preferred, other types of resins may be used and substituted in the foregoing examples. Such other resins must be solid at room temperature, must be cured or vulcanized at room temperature or slightly elevated temperatures, must be fused or released from a solution or emulsion on heating. If the resin is thermosetting it must be in a non-set condition when mixed with the fibers in order to permit subsequent molding and setting. If the material is film forming it must be applied in such a manner as not to bind the fibers together prior to molding. This may be accomplished by application of film forming resins to the fiber with subsequent drying prior to the formation of the interlocked mat. Such resins that may prove suitable include:

Thermoplastic resins—
    Polyvinyl chloride
    Polypropylene
    Polystyrene
    Vinyl-chloride-acetate copolymers
    Vinylidene chloride-vinyl chloride copolymer
    Vinylidene chloride
    Cellulose triacetate
    Cellulose acetate butyrate
    Methyl cellulose
    Polytri-fluorochloro-ethylene
    Vinyl butyral resins
    Chlorinated polyether
    Polyethylene
    Polyvinyl alcohol
    Cellulose acetate
    Cellulose nitrate
    Ethyl cellulose
    Polyamide (nylon)
    Polymethyl methacrylate
TFE-fluorocarbon
Thermosetting resins—
    Phenolics
    Urea
    Polyesters
    Alkyd resin
    Melamine
    Polyamide epoxy resin
    Diallyl phthalate resin
Elastomers—
    Rubber hydrochloride
    Acrylonitrile styrene copolymer
    Vinyl ether resins
    Vinylidene chloride-acrylonitrile resins
    Polyether
    Polyvinyl chloride polymers and copolymers with butadiene acrylonitrile
    Polyacrylate latex resins
    Vinyl nitrile rubber
    Neoprene
    Vinyl formal resins
    Silicone resins
    Urethane
    Chlorinated rubber
    Polyvinyl chloride polymers and copolymers with carboxyl modified butadiene acrylonitrile
Natural resins—
    Zein
    Copal
    Damar
    Kauri
    Sandarac
    Shellac
    Batu
    Elemi
    Manila Natural waxes—
  Paraffin
  Micro-crystalline waxes
Synthetic waxes—
  Polyethylene oxide
  Chlorinated paraffins
  Polyethylene glycols
Natural gum—
  Locust bean gum
Synthetic gum—
  Sodium carboxy methyl cellulose
  Ethylhydroxyethyl cellulose
  Hydroxyethyl cellulose
  Methyl cellulose
Starch—
  Potato starch
  Tapioca
  Etherized potato starch
Hydrocarbon resins—
  Turpene resin
  Coumarone resin While the preferred ratio of resin to fiber is 1 to 2 in most cases, an optimum ratio is determined by the physical and chemical properties of the fiber and desired properties of the molded product. For example, the ratio of fiber to resin to obtain an end product having 100,000 pounds tensile strength is 1 to 5 where nylon fibers and a vinyl chloride resin is used, but is 3 to 5 where the fiber is jute.

What is claimed is:

1. A moldable composition comprising a plurality of fibers formed into a porous mechanically interlocked fibrous mass, said mass having dispersed through the pores thereof a plurality of discrete, nontacky, nonfilm forming, nonplasticized heat moldable resin particles having a particle size of between .01 micron and .55 micron, said mass having a solids to void ratio of between 1 to 3 and 1 to 32, and said resin having a weight of between 2% and 70% of the weight of said solids.

2. A moldable composition comprising a plurality of jute fibers formed into a porous mechanically interlocked fibrous mass, said mass having dispersed through the pores thereof a plurality of discrete nonfilm forming, nonplasticized, heat moldable resin particles, said mass having a solids to void ratio of between 1 to 3 and 1 to 32, and said resin having a weight of between 2% and 70% of the weight of said solids.

3. A composition as set forth in claim 2 wherein said resin is polyvinyl chloride resin.

4. A moldable composition comprising a plurality of jute fibers formed into a porous but compact mass with some of said fibers needled through the mass to interlock said fibers, said mass having dispersed through the pores thereof a plurality of discrete, nonfilm forming, heat moldable vinyl chloride resin particles having a particle size of between .01 and .55 micron, said mass having a solids to void ratio of between 1 to 3 and 1 to 32, and said resin having a weight of between 2% and 70% of the weight of said solids.

5. A composition as set forth in claim 4 wherein said jute fibers have a hollow cellular structure with said resin contained in part within said structure.

6. A flat moldable composition for molding contoured articles comprising a plurality of jute fibers formed into a porous but compact flat mass with some of said fibers needled through the mass to interlock said fibers, said mass having dispersed through the pores thereof a plurality of discrete, nonfilm forming, nonplasticized, heat moldable polyvinyl chloride resin particles having a particle size of between .01 micron and .55 micron, said mass having a solids to void ratio of substantially 1 to 16 and said resin particles having a weight of substantially 50% of the weight of aid fibers.

7. A substantially flat moldable composition for molding contoured articles comprising a plurality of fibers formed into a porous mechanically interlocked substantially flat fibrous mass, said mass having dispersed through the pores thereof a plurality of discrete, nontacky, nonfilm forming, heat moldable resin particles, said mass having a solids to void ratio of between 1 to 3 and 1 to 32, said resin having a weight of between 2% and 70% of the weight of said solids.

8. A composition in accordance with the composition of claim 7 wherein said fibrous mass is reinforced on one side thereof with a reinforcing material.

References Cited in the file of this patent

UNITED STATES PATENTS

| | | |
|---|---|---|
| 2,121,496 | Bowen et al. | June 21, 1938 |
| 2,154,355 | Rawlings | Apr. 11, 1939 |
| 2,249,888 | Dodge | July 22, 1941 |
| 2,357,392 | Francis | Sept. 5, 1944 |
| 2,372,433 | Koon | Mar. 27, 1945 |
| 2,495,640 | Muskat | Jan. 24, 1950 |
| 2,805,181 | Groff et al. | Sept. 3, 1957 |